United States Patent
Chapman et al.

(10) Patent No.: US 12,528,272 B2
(45) Date of Patent: *Jan. 20, 2026

(54) FLAME RETARDANT VENEER PANEL

(71) Applicant: Goodrich Corporation, Charlotte, NC (US)

(72) Inventors: Christopher L. Chapman, Georgetown, IN (US); Brian Barnett, New Albany, IN (US); Nicholas William Linck, Lagrange, KY (US); John Michael Striegel, Sellersburg, IN (US); Abe Blessinger, Sellersburg, IN (US)

(73) Assignee: Goodrich Corporation, Charlotte, NC (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/429,794

(22) Filed: Feb. 1, 2024

(65) Prior Publication Data

US 2024/0165926 A1    May 23, 2024

Related U.S. Application Data

(62) Division of application No. 17/111,798, filed on Dec. 4, 2020, now Pat. No. 11,890,837.

(Continued)

(51) Int. Cl.
  *B32B 21/14*    (2006.01)
  *B32B 7/12*    (2006.01)
(Continued)

(52) U.S. Cl.
  CPC ............. *B32B 21/14* (2013.01); *B32B 7/12* (2013.01); *B32B 15/10* (2013.01); *B32B 15/20* (2013.01);
(Continued)

(58) Field of Classification Search
  CPC ..................................... B32B 21/14
  See application file for complete search history.

(56) References Cited

U.S. PATENT DOCUMENTS 4,693,926 A    9/1987  Kowalski et al.
8,083,878 B1   12/2011 Booth et al.
(Continued)

FOREIGN PATENT DOCUMENTS

CN    109808264 A    5/2019
CN    0110861372 A   3/2020
(Continued)

OTHER PUBLICATIONS

Extended European Search Report for European Patent Application No. EP21198042.0, dated Feb. 14, 2022.

*Primary Examiner* — Jeffry H Aftergut
(74) *Attorney, Agent, or Firm* — Suiter Swantz IP

(57) ABSTRACT

A veneer panel may include a face veneer, a first inner layer bonded to the face veneer, a second inner layer bonded to the first inner layer, and a thermally conductive layer bonded to the second inner layer. The first inner layer and the second inner layer are treated with a flame retardant. The first inner layer is disposed between the face veneer and the second inner layer, and the second inner layer is disposed between the first inner layer and the thermally conductive layer.

3 Claims, 4 Drawing Sheets

Related U.S. Application Data

(60) Provisional application No. 63/085,036, filed on Sep. 29, 2020.

(51) Int. Cl.
    *B32B 15/10*     (2006.01)
    *B32B 15/20*     (2006.01)
    *B32B 38/00*     (2006.01)

(52) U.S. Cl.
    CPC . *B32B 2038/0052* (2013.01); *B32B 2307/302* (2013.01); *B32B 2307/3065* (2013.01); *B32B 2311/24* (2013.01); *B32B 2451/00* (2013.01); *B32B 2607/00* (2013.01)

(56) References Cited

U.S. PATENT DOCUMENTS

| | | |
|---|---|---|
| 11,525,226 B2 * | 12/2022 | Chapman ................ E01F 13/02 |
| 2012/0067508 A1 | 3/2012 | Booth et al. |
| 2016/0311194 A1 | 10/2016 | Brown et al. |
| 2017/0050417 A1 | 2/2017 | St. Rock et al. |
| 2017/0057207 A1 | 3/2017 | Crapo |
| 2018/0272648 A1 * | 9/2018 | Ding ........................ B32B 5/26 |

FOREIGN PATENT DOCUMENTS

| | | |
|---|---|---|
| WO | 2006106232 A2 | 10/2006 |
| WO | 2011116657 A1 | 9/2011 |

* cited by examiner

FLAME RETARDANT VENEER PANEL

CROSS-REFERENCE TO RELATED APPLICATIONS

This application is a divisional of U.S. patent application Ser. No. 17/111,798, filed Dec. 4, 2020, which claims priority to U.S. Provisional Application No. 63/085,036 filed on Sep. 29, 2020, the entire contents of which are herein incorporated by reference in their entirety.

TECHNOLOGY

The present disclosure relates to decorative and structural panels, and, more specifically, to fire-resistant panels.

BACKGROUND

Various veneer panels are used in aircraft. Certain veneer panels may be susceptible to tearing, wrinkling, and curling. Further, veneer panels may experience delamination in some applications. In other instances, the veneer panels may not be useable in vehicular applications due to other limitations such as conformance with flammability regulations.

SUMMARY

A veneer panel includes, a face veneer, a first inner layer bonded to the face veneer, a second inner layer bonded to the first inner layer, the first inner layer and the second inner layer are treated with a flame retardant, and a thermally conductive layer bonded to the second inner layer wherein the thermally conductive layer is disposed between the first inner layer and the second inner layer.

The veneer panel can also include a first adhesive material disposed between the face veneer and the first inner layer, wherein the first adhesive material bonds the first inner layer to a back surface of the face veneer. A second adhesive material can be disposed between the thermally conductive layer and the second inner layer, wherein the second adhesive material bonds the first inner layer to the thermally conductive layer and bonds the second inner layer to the thermally conductive layer. The first adhesive material can include a phenolic adhesive and the second adhesive material comprises an acrylic adhesive. The phenolic adhesive can be a dry film phenolic adhesive.

The thermally conductive layer can include an annealed aluminum. A thickness of the first adhesive material can be between 0.001 inches and 0.01 inches and more specifically 0.002 inches and 0.007 inches inclusive (i.e., between 0.0508 mm and 0.1778 mm). A thickness of the second adhesive material can be between 0.001 inches and 0.01 inches and more specifically 0.001 inches and 0.01 inches inclusive (i.e., between 0.0254 mm and 0.254 mm).

A thickness of the thermally conductive layer can be between 0.001 inches and 0.040 inches, and more specifically between 0.001 inches and 0.020 inches inclusive (i.e., between 0.0254 mm and 0.508 mm). A thickness of the face veneer can be between 0.016 inches and 0.024 inches inclusive (i.e., from 0.4064 mm to 0.6096 mm). A thickness of the first inner layer can be between 0.016 inches and 0.024 inches inclusive (i.e., between 0.4064 mm and 0.6096 mm). A thickness of the second inner layer can be between 0.016 inches and 0.024 inches inclusive (i.e., between 0.4064 mm and 0.6096 mm).

The second inner layer can be a backing layer. The face veneer can include a wood. A combination of the first inner layer, the second inner layer, and the thermally conductive layer can be treated with a fire retardant solution. wherein the fire retardant solution can include bromide, and wherein the face veneer is not treated with a flame retardant.

A method of manufacturing a veneer panel, is also disclosed. The method include stacking a second adhesive material between a first inner layer and a thermally conductive layer and between a second inner layer and the thermally conductive layer, stacking a first inner layer, a second inner layer, and a thermally conductive layer, applying heat and pressure to the first inner layer, the adhesive material, the second inner layer, and the thermally conductive layer to create a first stack, treating the first stack with a chemical bath, stacking a face veneer and the first stack, disposing a first adhesive material between the first stack and the face veneer, and applying heat and pressure to the face veneer and the first stack.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

It should be appreciated that considerable benefits will be realized for the safety of passengers and crew in aircraft flying throughout the world to provide a flame resistant wood veneer panel for the construction of aviation interior structures which meets the stringent vertical flammability requirements of Federal Aviation Requirement (FAR) 25.853, which is part of the Title 14 of the Code of Federal Regulations (CFR), issued by the Federal Aviation Administration (FAA), such as the present four-ply flame retardant veneer panel system discussed in greater detail hereinafter.

Figure 1:
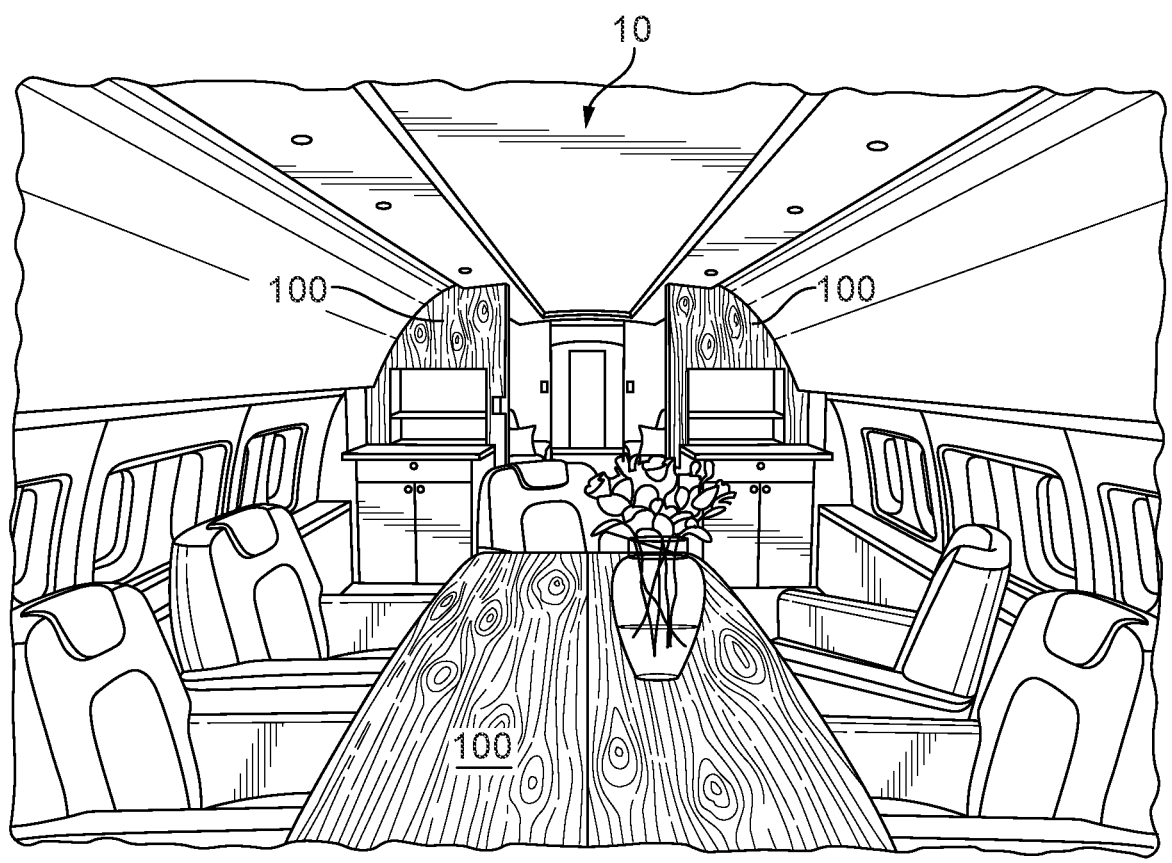
FIG. 1 illustrates an aircraft interior including various elements comprising veneer panels, in accordance with various embodiments.

Referring now to FIG. 1, an aircraft interior 10 including various elements comprising aviation veneer panels 100 is shown, in accordance with various embodiments. Aviation veneer panels 100 may include four-ply veneer panels, as described below, mounted or otherwise coupled to a substrate (e.g., cabinetry, tables, chairs, hand rails, etc.).

Referring now to FIGS. 2A-2D, a flame retardant veneer panel system 101 maybe formed by first forming a first stack 102 comprising a first fire-treated inner layer 130a (also referred to herein as a first inner layer) and a second fire-treated inner layer 130b (also referred to herein as a second inner layer). First inner layer 130a includes a first surface 131a and a second surface 132a opposite first surface 131a. First inner layer 130a may comprise a thin layer of poplar wood, or other wood species. In various embodiments, a thickness T2 of first inner layer 130a extending from first surface 131a to second surface 132a may be between 0.016 inches and 0.024 inches (i.e., between 0.4064 mm and 0.6096 mm). In various embodiments, T2 may be between 0.017 inches and 0.023 inches (i.e., between 0.4318 mm and 0.5842 mm). In various embodiments, T2 may be between 0.018 inches and 0.022 inches (i.e., between 0.4572 mm and 0.5588 mm).

Second inner layer 130b may be similar to first inner layer 130a. In this regard, second inner layer 130b includes a first surface 131b and a second surface 132b opposite first surface 131b. Second inner layer 130b may comprise a thin layer of poplar wood, or other wood species. In various embodiments, a thickness T5 of second inner layer 130b extending from first surface 131b to second surface 131b may be between 0.016 inches and 0.024 inches (i.e., between 0.4064 mm and 0.6096 mm). In various embodiments, T5 may be between 0.017 inches and 0.023 inches (i.e., between 0.4318 mm and 0.5842 mm). In various embodiments, T5 may be between 0.018 inches and 0.022 inches (i.e., between 0.4572 mm and 0.5588 mm).

In various embodiments, a wood grain of first inner layer 130a is oriented in a first direction, such as the X-direction for example, and a wood grain of second inner layer 130b is oriented in a second direction, such as the Y direction for example. In this manner, the wood grains of first inner layer 130a and second inner layer 130b are oriented perpendicular to one another to create a tension-balanced panel 102 once the first inner layer 130a and second inner layer 130b are cured together via an adhesive material 135 (also referred to herein as a third adhesive).

A thermally conductive layer 150 is placed between the first inner layer 130a and the second inner layer 130b. Thermally conductive layer 150 may comprise a material having a thermally conductivity of 40 W/m·K or greater. In various embodiments, thermally conductive layer 150 comprises a metal. Thermally conductive layer 150 may comprise one or more layers of aluminum or an aluminum alloy. In various embodiments, thermally conductive layer 150 comprises a thin sheet of annealed aluminum. In various embodiments, thermally conductive layer 150 may comprise an aluminum foil layer. Thermally conductive layer 150 includes a first surface 151 and a second surface 152 opposite first surface 151. In various embodiments, a thickness T5 of thermally conductive layer 150 extending from first surface 151 to second surface 152 may be between 0.001 inches and 0.040 inches, more specifically, 0.001 inches and 0.020 inches (i.e., between 0.0254 mm and 0.508 mm). In various embodiments, T5 may be between 0.005 inches and 0.020 inches (i.e., between 0.127 mm and 0.508 mm).

In various embodiments, adhesive material 116 comprises a flame-retardant acrylic adhesive. In various embodiments, adhesive material 116 may be in the form of a thermoset adhesive, such as a dry film acrylic adhesive. A dry film acrylic adhesive may allow adhesive material 116 to be cut in a sheet form and disposed between thermally conductive layer 150 each of the inner layers 130a and 130b. In various embodiments, a thickness T7 of adhesive material 116 extending from a first surface 163 of adhesive material 116 to a second surface 164 of adhesive material 116 may be between 0.001 inches and 0.01 inches (i.e., between 0.0254 mm and 0.254 mm).

Figure 2A:
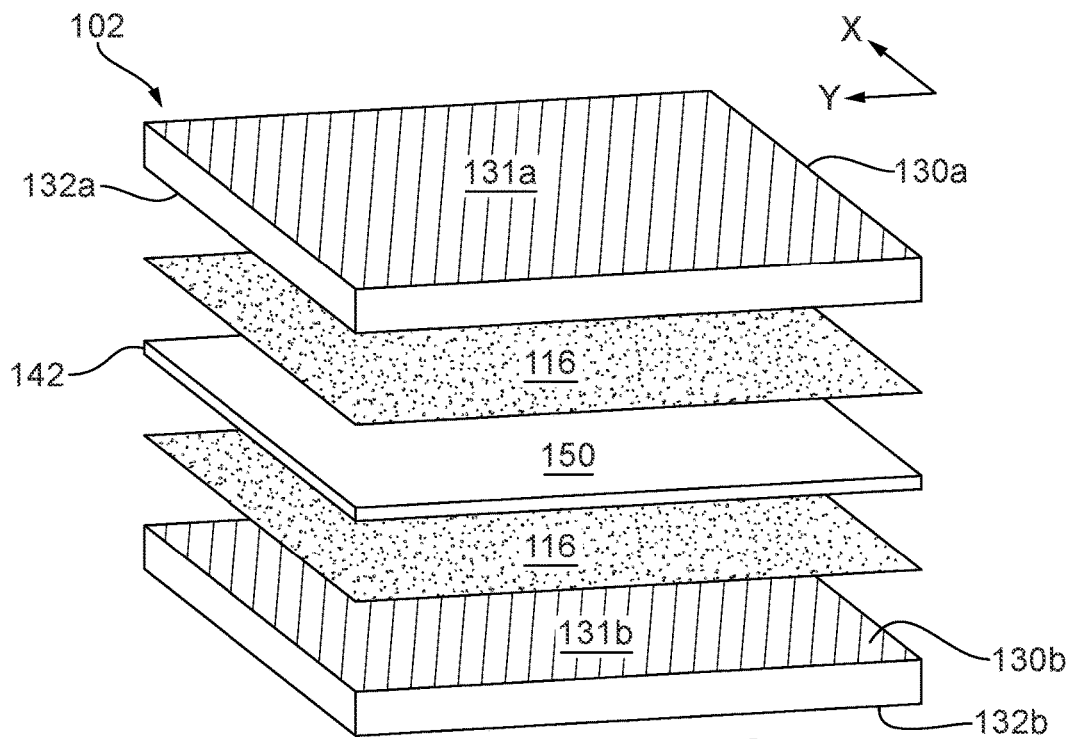
FIGS. 2A and 2B illustrate an assembly view and a cross sectional view, respectively, of an inner panel for incorporation into veneer panels, in accordance with various embodiments.
Figure 2B:
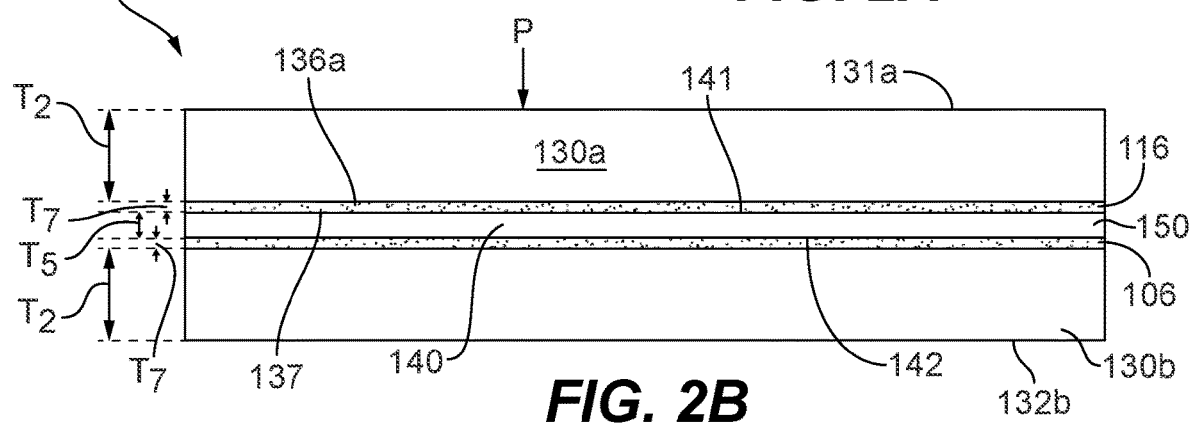

With reference to FIG. 2B, a heat and/or pressure treatment of the first stack 102 (e.g., pressing the first stack 102 inside a press machine) is illustrated, in accordance with various embodiments. Pressure P may be a compressive force applied uniformly and/or substantially uniformly across the outer surfaces of the first stack 102 through first inner layer 130a and second inner layer 130b. the first stack 102 may also be heated to reach a thermal threshold necessary to cure the adhesive material 116 to bond inner layers 130a and 120b to thermally conductive layer.

Figure 2C:
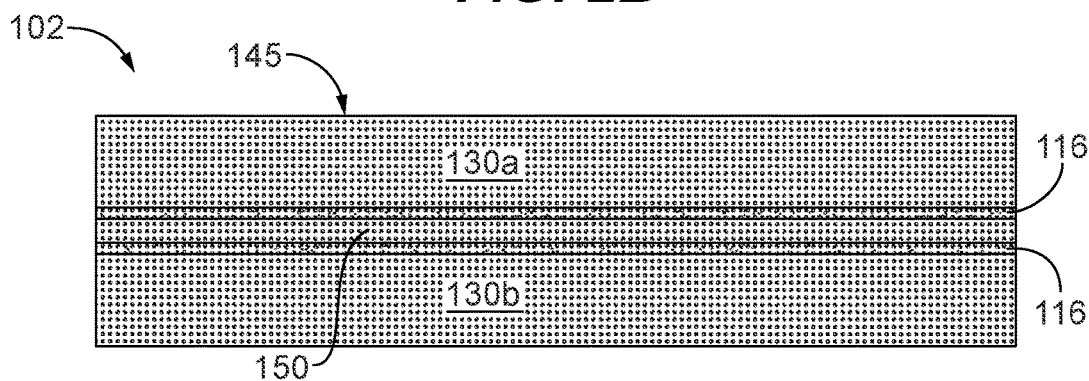
FIG. 2C illustrates a cross section view of the inner panel of FIG. 2B after being chemically treated with a flame retardant, in accordance with various embodiments.

With reference to FIG. 2C, the first stack 102 may be treated with a flame retardant 145 for fire protection. Flame retardant 145 may comprise a bromide solution. In this regard flame retardant 145 may be a brominated flame retardant. Other flame retardants contemplated herein include halogenic chemicals, phosphates, acids, chitosan, boric acid, ammonium borates, ammonium polyphosphate, melamine, borates, silicates, organic silicone, zinc borates, metal hydroxides, sulfonates, graphite or graphene, intumescence, sodium hex metaphosphate, polyethylenimine, among others.

In various embodiments, the first stack 102 is soaked with the flame retardant 145. In various embodiments, the flame retardant 145 is brushed or rolled onto the first stack 102. In various embodiments, the first stack 102 is placed into a bath of the flame retardant 145 for a pre-determined duration. The flame retardant 145 may be absorbed into the first stack 102. The flame retardant 145 is carried by the first stack 102. In response to being burned, for example during a fire, the flame retardant 145—which is infused in the first stack 102—emits a gas to suffocate the flames and extinguish the fire. In this regard, flame retardant 145 may act as a gas phase flame retardant by forming a blanket of noncombustible gasses around the flame front. In various embodiments, the first stack 102 is sanded down to a desired thickness after being treated with the flame retardant 145.

Figure 2D:
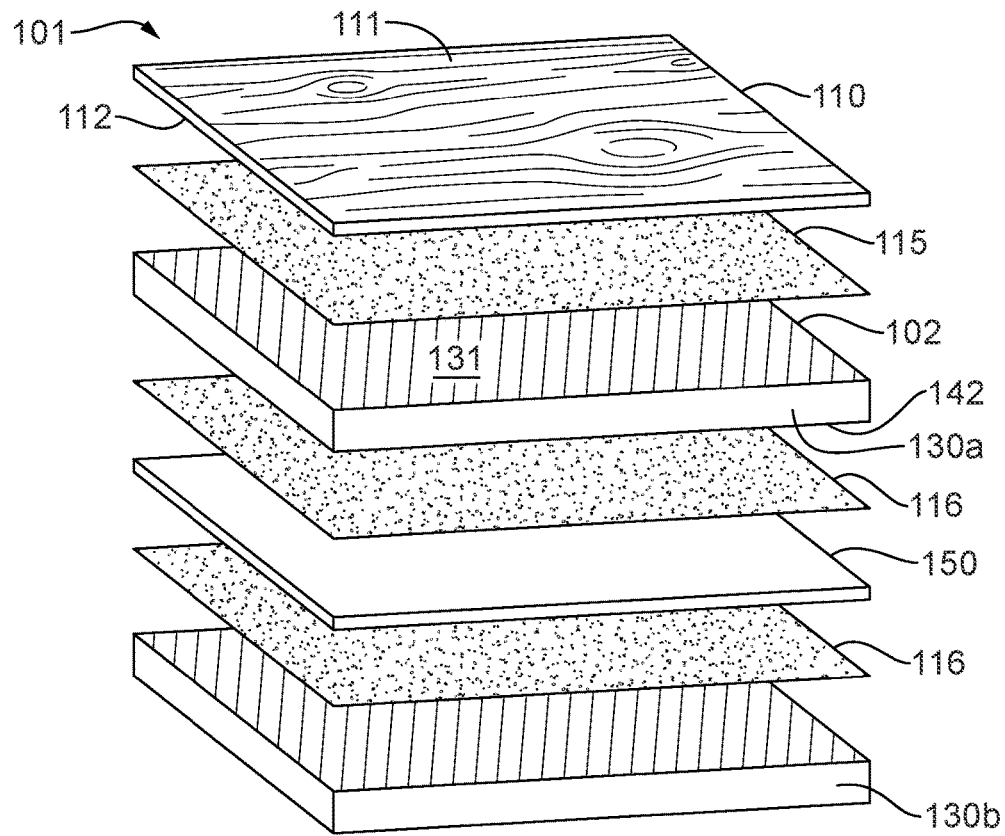
FIGS. 2D and 2E illustrate an assembly view and a cross sectional view, respectively, of a veneer panel including a face veneer layer, a chemically treated inner panel, in accordance with various embodiments.
Figure 2E:
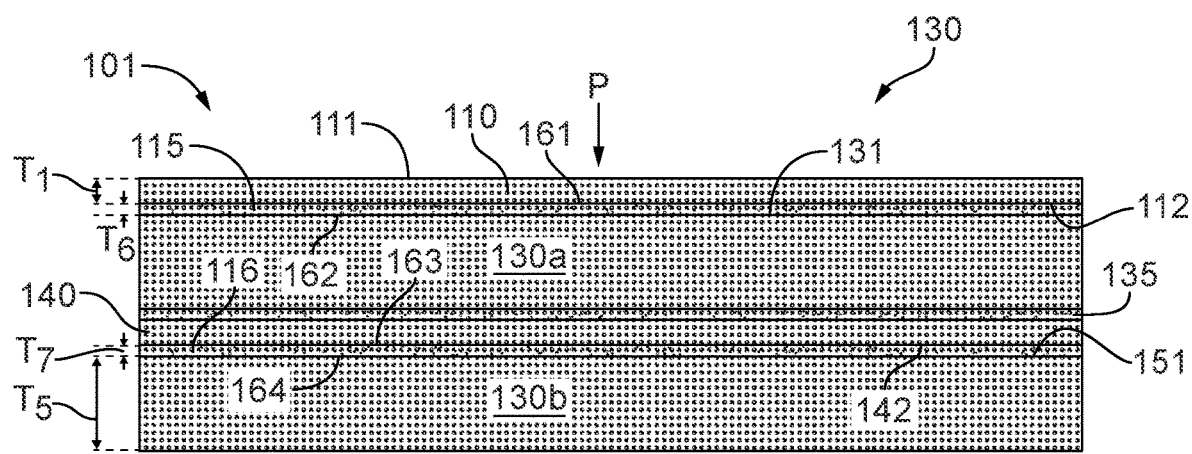

With combined reference to FIG. 2D and FIG. 2E, four-ply flame retardant veneer panel system 101 is further formed by adding a face veneer layer 110 to the first stack 102. Face veneer layer 110 may comprise a thin layer of wood, such as walnut, cherry, birch, rosewood, oak, maple, mahogany, hemlock, teak, walnut, or other wood species. Face veneer layer 110 may be manufactured from most wood species, common and exotic alike. Face veneer layer 110 may also be a manufactured product comprising one or more natural wood(s) and/or synthetic materials, referred to herein as "composite wood." Face veneer layer 110 may include a first surface 111 (also referred to as a face surface) and a second surface 112 (also referred to as a back surface) opposite first surface 111. Back surface 112 of face veneer layer 110 may be oriented toward thermally conductive layer 150. In various embodiments, first surface 111 of face veneer layer 110 may be sanded to provide a smooth, decorative surface for finishing. In various embodiments, a thickness T1 of face veneer layer 110 extending from first surface 111 to second surface 112 may be between 0.005 inches and 0.030 inches and more specifically between 0.005 inches and 0.030 inches and more specifically 0.016 inches and 0.024 inches (i.e., from 0.4064 mm to 0.6096 mm). In various embodiments, face veneer layer 110 is not treated with a flame retardant. However, face veneer layer 110 may be treated with a flame retardant, in accordance with various embodiments.

In various embodiments, an adhesive material 115 (also referred to herein as a first adhesive material) may be applied between face veneer layer 110 and first inner layer 130a. In various embodiments, adhesive material 115 comprises a phenolic resin. In various embodiments, adhesive material 115 comprises a vinyl-phenolic resin. In various embodiments, adhesive material 115 may be in the form of a thermoset adhesive, such as a dry film phenolic adhesive. A dry film phenolic adhesive may allow adhesive material 115 to be cut in a sheet form and disposed between second surface 112 of face veneer layer 110 and first surface 131a of first inner layer 130a during the layup process. In various embodiments, a thickness T6 of adhesive material 115 extending from a first surface 161 of adhesive material 115 to a second surface 162 of adhesive material 115 may be between 0.002 inches and 0.007 inches (i.e., between 0.0508 mm and 0.1778 mm).

With momentary reference to FIG. 2E, a heat and/or pressure treatment of veneer panel system 101 (e.g., pressing veneer panel system 101 inside a press machine) is illustrated, in accordance with various embodiments. Pressure P may be a compressive force applied uniformly and/or substantially uniformly across the outer surfaces of veneer panel system 101 through face veneer layer 110, first inner layer 130a, second inner layer 130b, and thermally conductive layer 150. Veneer panel system 101 may also be heated to reach a thermal threshold necessary to cure the adhesive material 115 to bond first inner layer 130a. For example, the adhesive material 115 may wet second surface 112 of face veneer layer 110 and first surface 131a of first inner layer 130a.

Veneer panel system 101 may be formed in any dimensions, and may readily be made into rectangular 4 foot by 8 foot (i.e., 1.2 m by 2.4 m) panels. Veneer panel system 101 may also be cut into smaller sizes or varied shapes, depending on the substrate (e.g., cabinet, table, rail, etc.) to which veneer panel system 101 may be mounted.

Figure 3:
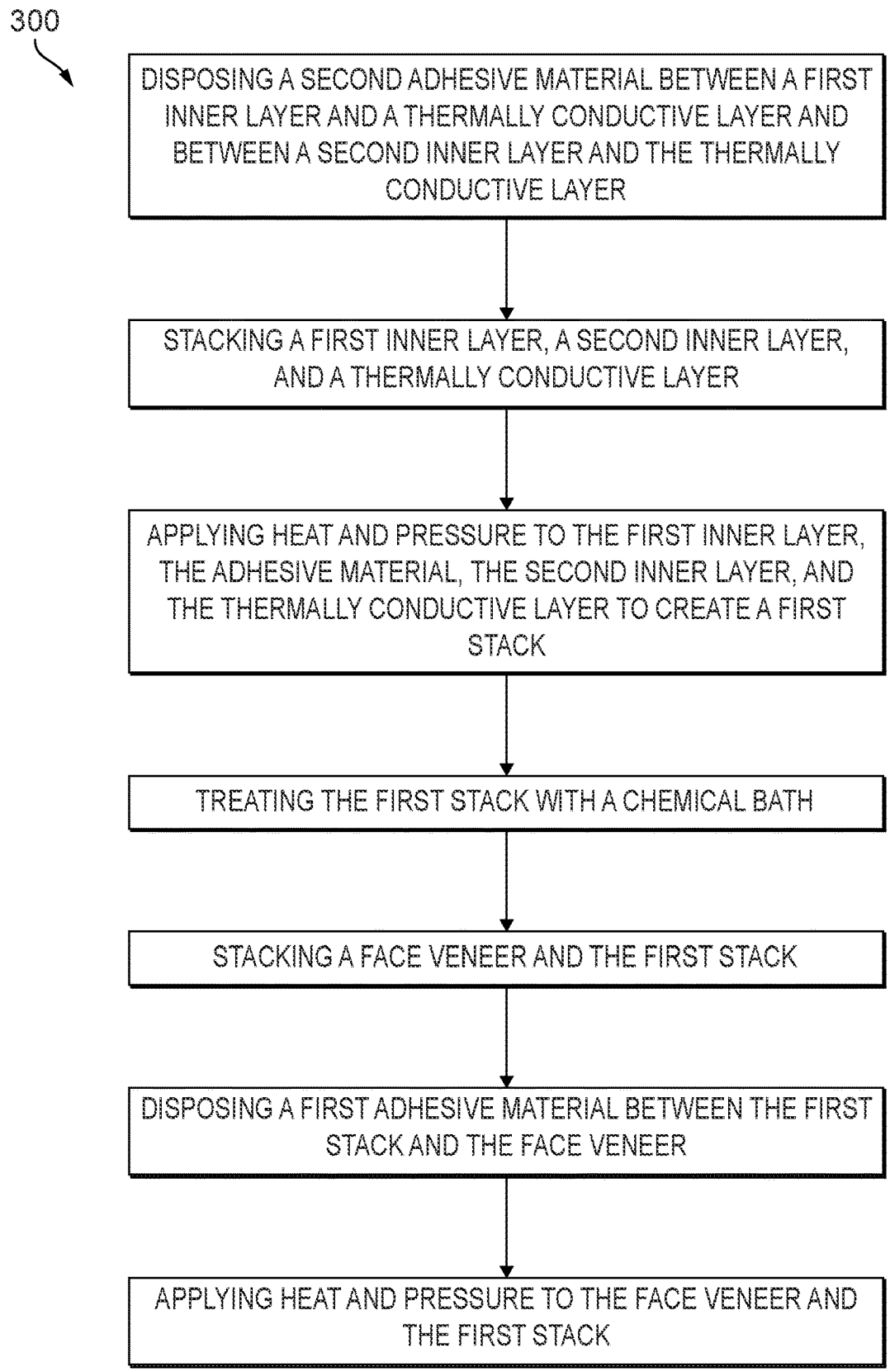
FIG. 3 illustrates a flow diagram of a method of making a four-ply veneer panel, according to various embodiments.

Veneer panel system 101 may be configured to address fire retardancy on two fronts: first, by releasing noncombustible gasses from the flame retardant solution (i.e., flame retardant 145) of two-ply panel 102 that extinguishes the flames, and second, by drawing heat away from the flame, via thermally conductive layer 150, to extinguish the flame. Veneer panel system 101 may comply with FAR 25.853. FIG. 3, shows a step-by step a method 300 of making a veneer panel 101 described above.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a veneer panel, comprising:
disposing a second adhesive material between a first inner layer and a thermally conductive layer and between a second inner layer and the thermally conductive layer;
stacking a first inner layer, a second inner layer, and a thermally conductive layer;
applying heat and pressure to the first inner layer, the adhesive material, the second inner layer, and the thermally conductive layer to create a first stack;
treating the first stack with a chemical bath;
stacking a face veneer and the first stack;
disposing a first adhesive material between the first stack and the face veneer; and
applying heat and pressure to the face veneer and the first stack.

2. The method of claim 1, wherein the thermally conductive layer comprises an aluminum, a thickness of the thermally conductive layer is between 0.001 inches and 0.040 inches.

3. The method of claim 1, wherein the chemical bath includes a bromide solution.

\* \* \* \* \*